(12) United States Patent
Koppelaar et al.

(10) Patent No.: US 11,573,312 B2
(45) Date of Patent: Feb. 7, 2023

(54) METHOD AND SYSTEM FOR SINGLE TARGET DIRECTION OF ARRIVAL ESTIMATION FOR SPARSE ARRAY RADAR SYSTEMS

(71) Applicant: NXP B.V., Eindhoven (NL)

(72) Inventors: Arie Geert Cornelis Koppelaar, Giessen (NL); Yiting Lu, Eindhoven (NL); Francesco Laghezza, Eindhoven (NL); Feike Guus Jansen, Eindhoven (NL)

(73) Assignee: NXP B.V., Eindhoven (NL)

( * ) Notice: Subject to any disclaimer, the term of this patent is extended or adjusted under 35 U.S.C. 154(b) by 95 days.

(21) Appl. No.: 17/190,222

(22) Filed: Mar. 2, 2021

(65) Prior Publication Data
US 2022/0283283 A1 Sep. 8, 2022

(51) Int. Cl.
*G01S 13/44* (2006.01)

(52) U.S. Cl.
CPC ............... *G01S 13/4454* (2013.01)

(58) Field of Classification Search
CPC .................................................. G01S 13/4454
USPC ................................ 342/149, 175, 203, 195
See application file for complete search history.

(56) References Cited

U.S. PATENT DOCUMENTS

| | | | |
|---|---|---|---|
| 5,815,112 A * | 9/1998 | Sasaki | H01Q 21/22 342/175 |
| 8,994,581 B1 * | 3/2015 | Brown | G01S 13/931 342/149 |

FOREIGN PATENT DOCUMENTS

| WO | WO-2008/054347 A2 | 5/2008 |
|---|---|---|
| WO | WO-2008/054347 A3 | 5/2008 |

OTHER PUBLICATIONS

W. Kederer and J. Detlefsen, "Direction of Arrival (DOA) Determination Based on Monopulse Concepts". In: 2000 Asia-Pacific Microwave Conference. Proceedings (Cat. No. 00TH8522). IEEE, 2000. p. 120-123.
Zhang et al., "A Novel Monopulse Angle Estimation Method for Wideband LFM Radars," Sensors, v.16, iss.6 (Mar. 2016), p. 817.

* cited by examiner

*Primary Examiner* — Bo Fan

(57) ABSTRACT

A mechanism is provided for determining an unambiguous direction of arrival (DoA) for radio frequency (RF) signals received by a sparse array. A DoA angle domain is split into hypothesis regions. The hypothesis regions are derived from the phase differences of the antenna element pairs used for the DoA angle estimate. In each hypothesis region, the ambiguous phase of antenna element pairs is unwrapped according to expected wrap-around. After unwrapping the phase, for each hypothesis region, a phasor is calculated by combining the individual antenna element pair phasors. The hypothesis region that obtains the phasor with a largest amplitude is selected as the most likely DoA region and the phase of the winning phasor is used as an unambiguous estimate for the DoA angle.

18 Claims, 6 Drawing Sheets

METHOD AND SYSTEM FOR SINGLE TARGET DIRECTION OF ARRIVAL ESTIMATION FOR SPARSE ARRAY RADAR SYSTEMS

BACKGROUND

Field

This disclosure relates generally to radar systems and associated methods of operation, and more specifically, to providing a low-complexity, high-accuracy direction of arrival estimation mechanism for sparse radar antenna arrays.

Related Art

Radar systems are used to detect the range, velocity, and angle of targets. With advances in technology, radar systems can now be applied in many different applications, such as automotive radar safety systems, but not every radar system is suitable for every application. For example, 77 GHz Frequency Modulation Continuous Wave (FMCW) Fast Chirp Modulation (FCM) radars are used with multiple-input, multiple-output (MIMO) arrays as sensors in Advanced Driver Assistance System (ADAS) and autonomous driving (AD) systems.

In signal processing, direction of arrival (DoA) denotes a direction from which a propagating wave arrives at a point, where a set of sensors are located. The set of sensors forms a sensor array. DoA mechanisms are enabled in phased-array applications by leveraging signal reception across multiple antenna elements to determine a signal's azimuth or elevation. DoA mechanisms are commonly used in radar, communications, and other applications to determine the direction of a signal source.

Phase Comparison Monopulse is a low-complexity high accuracy DoA estimation method for Uniform Linear Arrays (ULAs). When antenna elements in an antenna array are spaced λ/2 or less, the phase difference of two consecutive antenna elements provides an unambiguous estimate for the DoA angle. For antenna elements having spacing larger than λ/2 (e.g., a sparse array), an unambiguous estimate for the DoA angle cannot be made. Further, selecting all possible pairs of antenna elements for maximizing the signal-to-noise ratio (SNR) of the DoA estimate does not lead to an independent set of estimates and therefore combining these individual estimates does not maximize the SNR.

BRIEF DESCRIPTION OF THE DRAWINGS

Embodiments of the present invention may be better understood by referencing the accompanying drawings.

The use of the same reference symbols in different drawings indicates identical items unless otherwise noted. The figures are not necessarily drawn to scale.

DETAILED DESCRIPTION

Figure 1:
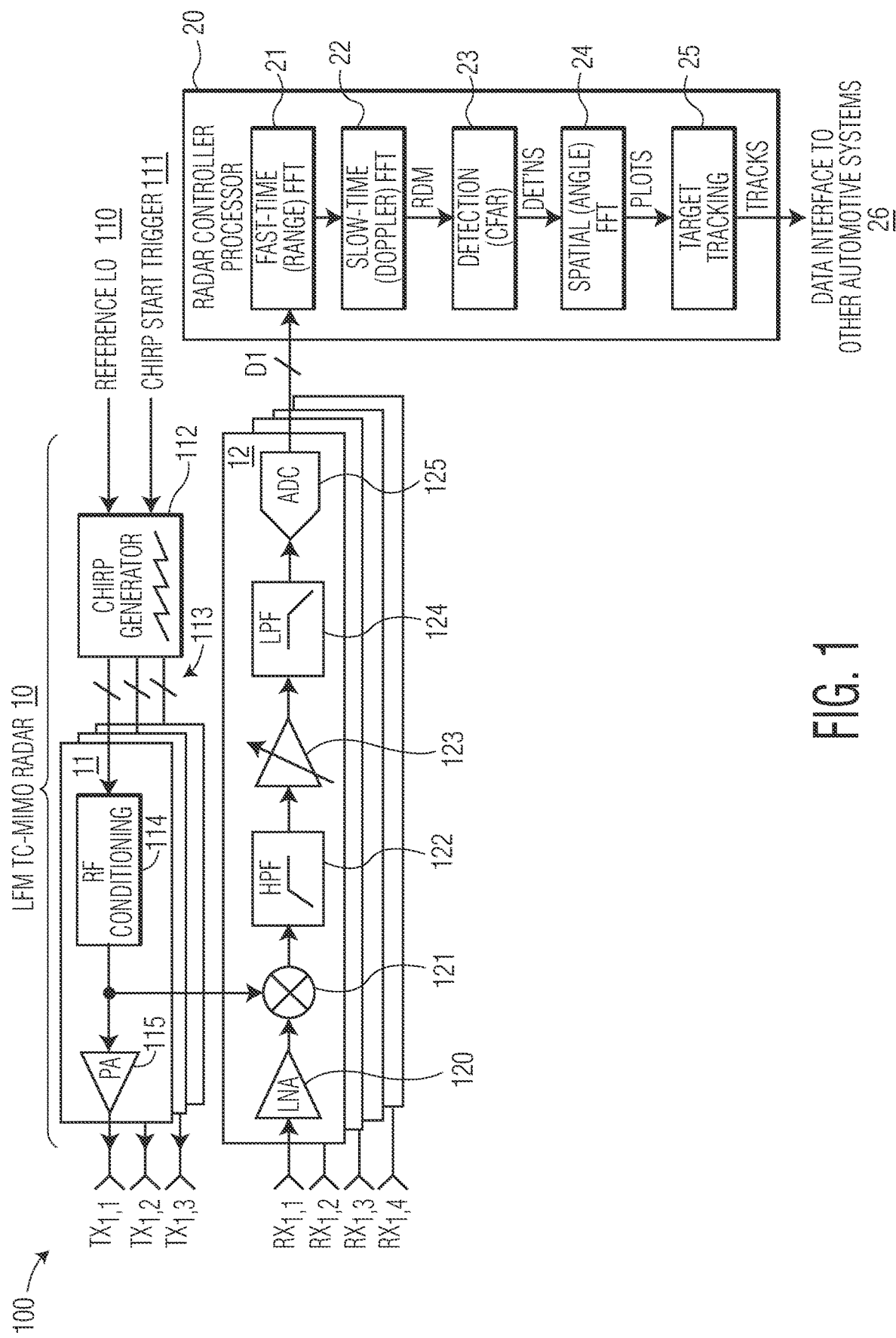
FIG. 1 which depicts a simplified schematic block diagram of a LFM TD-MIMO automotive radar system which includes an LFM TD-MIMO radar device connected to a radar controller processor.

Embodiments of the present invention provide a mechanism for determining an unambiguous direction of arrival for radio frequency (RF) signals received by a sparse array. Embodiments perform a number of sources estimation to determine whether the likelihood of the presence of a single source or multiple sources (for example, a source can be a target reflecting a radar pulse). For a single source, the DoA angle domain is split into hypothesis regions. The hypothesis regions are derived from the phase differences of the antenna element pairs used for the DoA angle estimate. In each hypothesis region, the ambiguous phase of antenna element pairs is unwrapped according to expected wrap-around (e.g., accounting for and removing a $2\pi$ phase wraparound). After unwrapping the phase, for each hypothesis region, a phasor is calculated by combining the individual antenna element pair phasors. The hypothesis region that obtains the phasor with a largest amplitude is selected as the most likely DoA region and the phase of the winning phasor is used as an unambiguous estimate for the DoA angle. In order to avoid using information from antenna elements multiple times and thereby correlating individual DoA estimates, in some embodiments, the combining of individual antenna pair phasors is performed by weighting them prior to addition.

In the context of the present disclosure, it will be appreciated that radar systems may be used as sensors in a variety of different applications, including but not limited to automotive radar sensors for road safety systems, such as advanced driver-assistance systems (ADAS) and autonomous driving (AD) systems. In such applications, radar systems are used to measure radial distance to a reflecting object, the object's relative radial velocity and angle information, and are characterized by performance criteria, such as the angular resolution (the minimum distance between two equal large targets at the same range and range rate (or radial velocity) resolution cell which a radar is able to distinguish and separate to each other), sensitivity, false detection rate, and the like. Typically, frequency modulated continuous wave (FMCVV) modulation radars are used to identify the distance, velocity, and/or angle of a radar target, such as a car or pedestrian, by transmitting Linear Frequency Modulation (LFM) waveforms from multiple transmit antennas so that reflected signals from the radar target are received at multiple receive antennas and processed to determine the radial distance, relative radial velocity, and angle (or direction) for the radar target. However, with current automotive designs, a vehicle can include multiple radar transmitters that operate independently from one another. As a result, the LFM waveform transceivers may be configured to implement time-division (TD) MIMO operations to temporally separate signals originated from distinct transmitters so that a receiving channel can distinctly detect each signal and thereby construct a virtual MIMO array. It should be noted that embodiments of the present invention are not limited to TD MIMO operation, but can also be applied to multiple-access MIMO schemes (e.g., frequency division, Doppler division, and code division) and single transmitter-receiver radar systems.

To illustrate the design and operation of a conventional TD MIMO radar system, reference is now made to FIG. 1 which depicts a simplified schematic block diagram of a conventional LFM TD-MIMO automotive radar system 100 which includes an LFM TD-MIMO radar device 10 connected to a radar controller processor 20. In selected embodiments, the LFM TD-MIMO radar device 10 may be embodied as a line-replaceable unit (LRU) or modular component that is designed to be replaced quickly at an operating location. Similarly, the radar controller processor 20 may be embodied as a line-replaceable unit (LRU) or modular component. Although a single or mono-static LFM TD-MIMO radar device 10 is shown, it will be appreciated that additional distributed radar devices may be used to form a distributed or multi-static radar. In addition, the depicted radar system 100 may be implemented in integrated circuit form with the LFM TD-MIMO radar device 10 and the radar controller processor 20 formed with separate integrated circuits (chips) or with a single chip, depending on the application.

Each radar device 10 includes one or more transmitting antenna elements $TX_i$ and receiving antenna elements $RX_j$ connected, respectively, to one or more radio-frequency (RF) transmitter (TX) units 11 and receiver (RX) units 12. For example, each radar device (e.g., 10) is shown as including individual antenna elements (e.g., $TX_{1,i}$, $RX_{1,j}$) connected, respectively, to three transmitter modules (e.g., 11) and four receiver modules (e.g., 12), but these numbers are not limiting, and other numbers are also possible, such as four transmitter modules 11 and six receiver modules 12, or a single transmitter module 11 and/or a single receiver module 12. Each radar device 10 also includes a chirp generator 112 which is configured and connected to supply a chirp input signal to the transmitter modules 11. To this end, the chirp generator 112 is connected to receive a separate and independent local oscillator (LO) signal 110 and a chirp start trigger signal 111, though delays are likely to be different due to the signal path differences and programmable digital delay elements in the signal paths. Chirp signals 113 are generated and transmitted to multiple transmitters 11, usually following a pre-defined transmission schedule, where they are filtered at the RF conditioning module 114 and amplified at the power amplifier 115 before being fed to the corresponding transmit antenna $TX_{1,i}$ and radiated. By sequentially using each transmit antenna $TX_{1,i}$ to transmit successive pulses in the chirp signal 113, each transmitter element 11 operates in a time-multiplexed fashion in relation to other transmitter elements because they are programmed to transmit identical waveforms on a temporally separated schedule.

The radar signal transmitted by the transmitter antenna unit $TX_{1,i}$, $TX_{2,i}$ may be reflected by an object, and part of the reflected radar signal reaches the receiver antenna units $RX_{1,i}$ at the radar device 10. At each receiver module 12, the received (radio frequency) antenna signal is amplified by a low noise amplifier (LNA) 120 and then fed to a mixer 121 where it is mixed with the transmitted chirp signal generated by the RF conditioning unit 113. The resulting intermediate frequency signal is fed to a first high-pass filter (HPF) 122. The resulting filtered signal is fed to a first variable gain amplifier 123 which amplifies the signal before feeding it to a first low pass filter (LPF) 124. This re-filtered signal is fed to an analog/digital converter (ADC) 125 and is output by each receiver module 12 as a digital signal D1. The receiver module compresses target echo of various delays into multiple sinusoidal tones whose frequencies correspond to the round-trip delay of the echo.

The radar system 100 also includes a radar controller processing unit 20 that is connected to supply input control signals to the radar device 10 and to receive therefrom digital output signals generated by the receiver modules 12. In selected embodiments, the radar controller processing unit 20 may be embodied as a micro-controller unit (MCU) or other processing unit that is configured and arranged for signal processing tasks such as, but not limited to, target identification, computation of target distance, target velocity, and target direction, and generating control signals. The radar controller processing unit 20 may, for example, be configured to generate calibration signals, receive data signals, receive sensor signals, generate frequency spectrum shaping signals (such as ramp generation in the case of FMCW radar) and/or register programming or state machine signals for RF (radio frequency) circuit enablement sequences. In addition, the radar controller processor 20 may be configured to program the modules 11 to operate in a time-division fashion by sequentially transmitting LFM chirps for coordinated communication between the transmit antennas $TX_{1,i}$, $RX_{1,j}$. The result of the digital processing at the radar controller processing unit 20 is that the digital domain signals D1 are processed for the subsequent fast-time range FFT 21, slow-time Doppler FFT 22, constant false alarm rate (CFAR) target detection 23, spatial angle estimation 24, and target tracking processes 25, with the result being output 26 to other automotive computing or user interfacing devices for further process or display.

It should be noted that while example embodiments incorporating radar systems are discussed below, embodiments of the present invention are not limited to radar systems and can include other radio frequency (RF) systems in which determining the direction of arrival of an RF signal is desirable.

Figure 2:
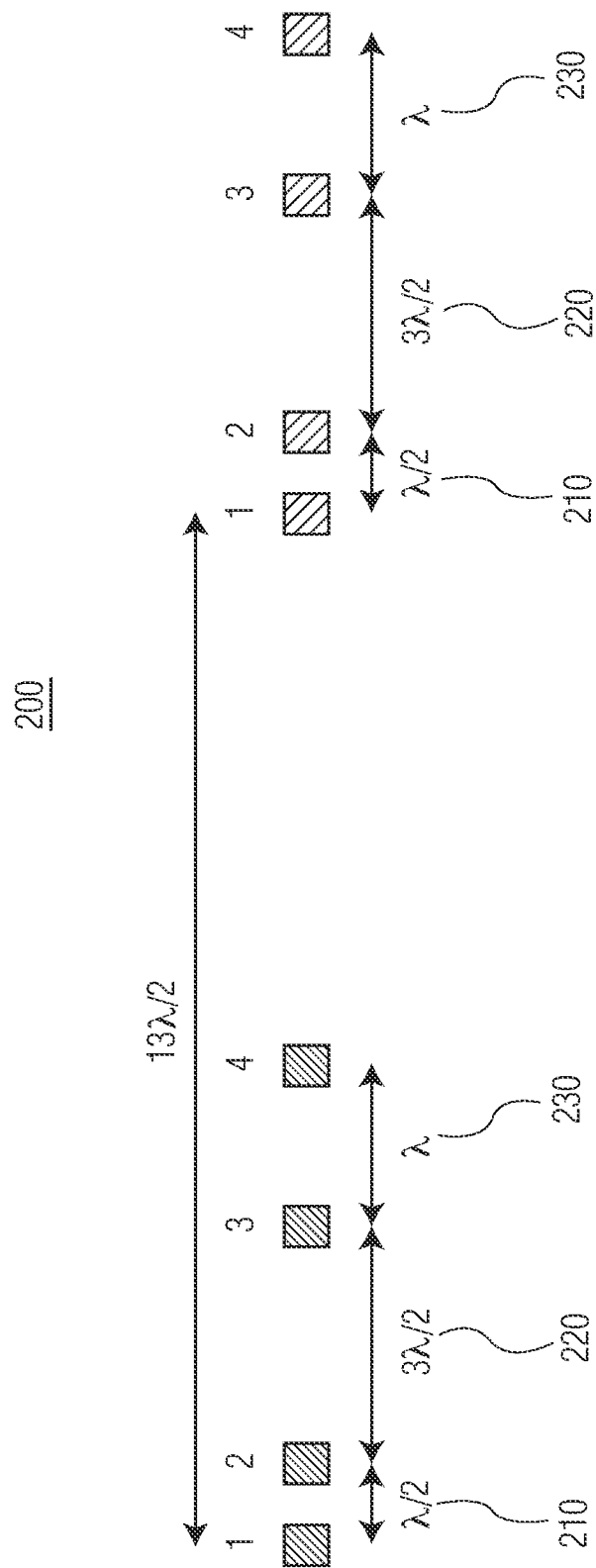
FIG. 2 is a simplified block diagram illustrating an example of a sparse virtual antenna array usable by embodiments of the present invention.

FIG. 2 is a simplified block diagram illustrating an example of a sparse virtual antenna array 200. Sparse virtual antenna array 200 is associated with a 2×4 MIMO configuration consisting of two transmit antennas (e.g., TX1,1 and TX1,2) that are spaced 13/2λ apart and four receive antennas (e.g., RX1,1, RX1,2, RX1,3, and RX1,4) that are placed in a four-element Minimum Redundancy Array (MRA) configuration. A four-element MRA has four antenna elements with consecutive spacings of ½λ (first-second element 210), 3/2λ (second-third element 220) and λ (third-fourth element 230). The two transmit antennas in combination with the four receive antennas results in an eight-element sparse virtual antenna array.

Embodiments of the present invention perform spatial angle estimation 24 using Phase Comparison Monopulse DoA estimation, which is a low-complexity high accuracy DoA estimation method for Uniform Linear Arrays (ULA's). For a signal wavelength λ, when the antenna elements are spaced λ/2 or less, the phase difference between two consecutive antenna elements is an unambiguous estimate for the DoA angle. An N-element ULA provides N−1 independent estimates for the DoA angle and therefore these N−1 estimates can be combined to improve the Signal-to-Noise Ratio (SNR) of the estimate. In a sparse array (e.g., sparse virtual antenna array 200), however, the antenna element spacing can be equal or larger than λ/2. For antenna elements pairs in which the antenna spacing is larger than λ/2 (e.g., 220 and 230), an unambiguous estimate for the DoA angle cannot be made. Further, selecting all possible pairs of antenna elements for maximizing the SNR of the DoA estimate does not lead to an independent set of estimates and therefore combining these individual estimates does not maximize the SNR.

Figure 3:
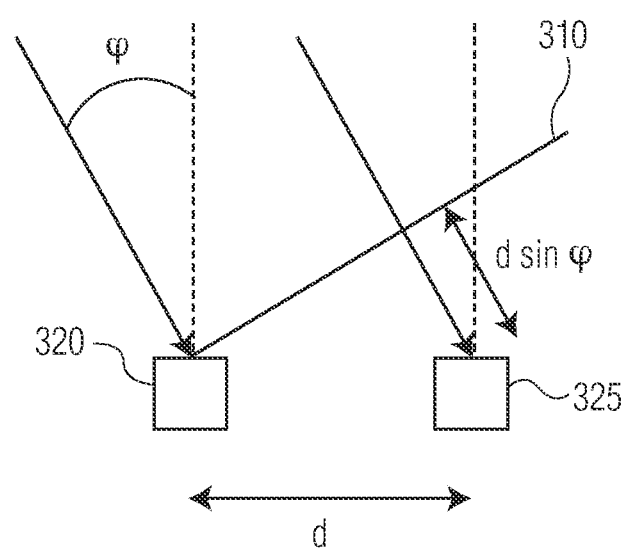
FIG. 3 is a simplified block diagram illustrating an example of a path length difference of an electromagnetic wavefront impinging on two antenna elements due to DoA angle φ, in accordance with embodiments of the present invention.

FIG. 3 is a simplified block diagram illustrating an example of a path length difference of an electromagnetic (EM) wavefront 310 impinging on two antenna elements due to DoA angle φ. Antenna elements 320 and 330 have a spacing d and a path length difference of the wavefront between the antenna elements is d sin φ. Under a narrowband assumption, this path length difference causes a signal phase difference between the antennas of θ=2π(d/λ)sin φ, where λ is the wavelength of the EM wave. Hence, given a signal phase difference of θ, the DoA angle φ can be determined using the formula:

$$\varphi = \sin^{-1}\frac{\theta}{2\pi(\frac{d}{\lambda})}.$$

This expression determines the DoA angle φ unambiguously between −π/2 and π/2 only when d≤λ/2.

The smallest spacing in the virtual array of FIG. 2 is d=λ/2 (210) and therefore the relation between the signal phase difference θ and DoA angle φ becomes θ=α=π sin φ. Since the spacings between other antenna elements is a multiple of λ/2, the resulting signal phase difference θ becomes a multiple of α (e.g. for antenna element spacing 220, d=3λ/2 and therefore the signal phase difference θ=3α=3π sin φ). For |sin φ|>⅓, the signal phase difference wraps around ([−π, π>) and as a consequence the DoA angle φ cannot be determined unambiguously.

The virtual antenna array illustrated in FIG. 2 has 19 different antenna spacings and therefore 19 different signal phase differences can be measured. All of these phase differences link to the same DoA angle φ. Table 1 shows all antenna spacings, the resulting signal phase differences and which antenna element pairs are responsible for the corresponding phase difference. Table 1 shows that some of the phase differences are realized by more than one antenna pair (e.g. the phase difference 13α is present in four antenna element pairs).

TABLE 1

| Antenna spacings and phase differences | | | | | |
| --- | --- | --- | --- | --- | --- |
| Antenna spacing × λ/2 | Phase Difference × α | Antenna pair | Antenna pair | Antenna pair | Antenna pair |
| 1 | 1 | 2-1 | 6-5 | | |
| 2 | 2 | 4-3 | 8-7 | | |
| 3 | 3 | 3-2 | 7-6 | | |
| 4 | 4 | 3-1 | 7-5 | | |
| 5 | 5 | 4-2 | 8-6 | | |
| 6 | 6 | 4-1 | 8-5 | | |
| 7 | 7 | 5-4 | | | |
| 8 | 8 | 6-4 | | | |
| 9 | 9 | 5-3 | | | |
| 10 | 10 | 6-3 | | | |
| 11 | 11 | 7-4 | | | |
| 12 | 12 | 5-2 | | | |
| 13 | 13 | 5-1 | 6-2 | 7-3 | 8-4 |
| 14 | 14 | 6-1 | | | |
| 15 | 15 | 8-3 | | | |
| 16 | 16 | 7-2 | | | |
| 17 | 17 | 7-1 | | | |
| 18 | 18 | 8-2 | | | |
| 19 | 19 | 8-1 | | | |

The signals at the eight antenna elements can be represented by complex values $Y_1, Y_2, \ldots, Y_8$. Phase differences of signals can be calculated by multiplying a complex value of one antenna element with a complex conjugate value of another antenna element. The argument of that product is then equal to the phase difference. For example, a phasor $Z_7 = Y_5 * \text{conj}(Y_4)$ is a complex value from which the argument is an unbiased estimate for the phase difference 7α, thus, $7\alpha_{est} = \arg(Z_7) \mod 2\pi$.

mod 2π, in the above equation, reflects the phase wrapping and if the phase is unwrapped, then $\alpha_{est}$ can be estimated from phasor $Z_7$: $\alpha_{est} = (\arg(Z_7) + k\,2\pi)/7$, where k is a positive or negative integer representing the correct phase unwrapping. Since, for the phase differences α, 2α, 3α and 4α, we have two antenna element pairs available, the corresponding phasors can be determined using averaging the two contributions, for example, $Z_1 = \frac{1}{2}*(Y_2*\text{conj}(Y_1) + Y_6*\text{conj}(Y_5))$. Similarly, the phase difference 13α is produced by four antenna element pairs and therefore the corresponding phasor can be determined by averaging the four contributions.

In total, one can determine 19 phasors: $Z_m = A_m \exp(j\theta_m)$, from which the argument is an unbiased estimate for phase difference $\theta_m = m\alpha_{est}$. When the phases are unwrapped, that is $\alpha_{m,est} = (\theta_m + k_m 2\pi)/m$, then the modified phasors $\tilde{Z}_m = A_m \exp(j\alpha_{m,est})$ will have the same phase and accordingly will add up coherently.

Figure 4:
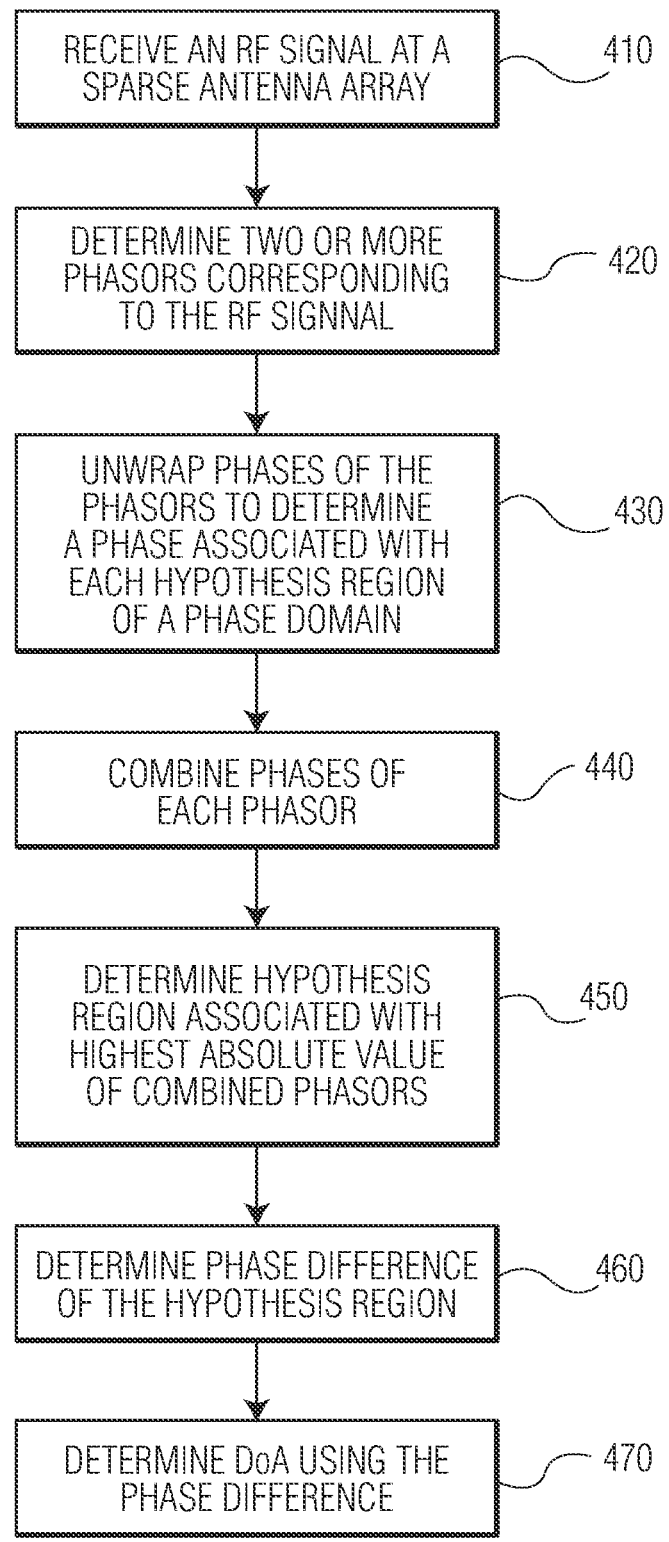
FIG. 4 is a simplified flow diagram illustrating an example of steps performed in determining a DoA from the phases of the phasors, in accordance with embodiments of the present invention.

FIG. 4 is a simplified flow diagram illustrating an example of steps performed in determining a DoA from the phases of the phasors, in accordance with embodiments of the present invention. The individual steps illustrated in FIG. 4 will be discussed more fully below. A radio frequency pulse is received at a sparse antenna array (e.g., 200) (410). A determination of two or more phasors associated with the RF pulse is made by a processor coupled to the sparse antenna array (e.g., radar controller processor 20) (420). An unwrapping of the phases of the detected phasors is performed on by the radar controller processor (430). This is performed in relation to hypothesis regions of the phase domain associated with the sparse antenna array, as will be discussed with regard to FIG. 5. The phases of the unwrapped phasors are then combined (440). From the combined phases, a hypothesis region associated with a highest absolute value of the combined phases is determined by the radar controller processor (450). Once the hypothesis region is determined, a phase difference associated with the hypothesis region is calculated (460) and using that phase difference, the DoA is determined (470).

The wraparound of the phases of the phasors can be done for a given value of α and since α=π sin φ also for a given value from φ. The domain of α can be split up into regions such that in each region the phase unwrapping of the individual phasors is unique. Each region then represents a hypothesis of the value of α, and if the hypothesis is correct, then the modified phasors $\tilde{Z}_m$ can be combined in a coherent way for that region (420). Hence, for each region k, a sum $$H_k = \sum_{m=1}^{M} w_m \tilde{Z}_m$$

can be calculated. A region, $k_{max}$, in which $|H_k|$ is maximal is determined, which is the most likely region representing the correct hypothesis. The estimate for α then becomes $\alpha_{est}=\arg(H_{k_{max}})$ (430) and the estimate for the DoA angle (440) is $$\varphi_{est} = \sin^{-1}\frac{\alpha_{est}}{\pi}.$$

In the calculation of $H_k$, weights $w_m$ are used. Weights $w_m$ are chosen to maximize the signal-to-noise ratio (SNR) of $H_k$. That is, the weights $w_m$ compensate for differences in SNR of the individual phasors and for possible noise-related correlations between the individual phasors.

As an example, the present method is applied to the phase differences α, 2α and 3α (e.g., the first three rows of Table 1). Thus, only 3-out-of-19 phase differences are considered. First the three corresponding individual phasors are determined:

$Z_1=\frac{1}{2}*(Y_2*\text{conj}(Y_1)+Y_6*\text{conj}(Y_5))$. (Note that $\arg(Z_1)$ is an unambiguous estimate for α.)
$Z_2=\frac{1}{2}*(Y_4*\text{conj}(Y_3)+Y_8*\text{conj}(Y_7))$. (Note that $\arg(Z_2)$ is an ambiguous estimate for 2α.)
$Z_3=\frac{1}{2}*(Y_3*\text{conj}(Y_2)+Y_7*\text{conj}(Y_6))$. (Note that $\arg(Z_3)$ is an ambiguous estimate for 3α.)

Then the absolute value and the argument of these phasors is determined:

$A_m=\text{abs}(Z_m)$ $\theta_m=\arg(Z_m)$.

Figure 5:
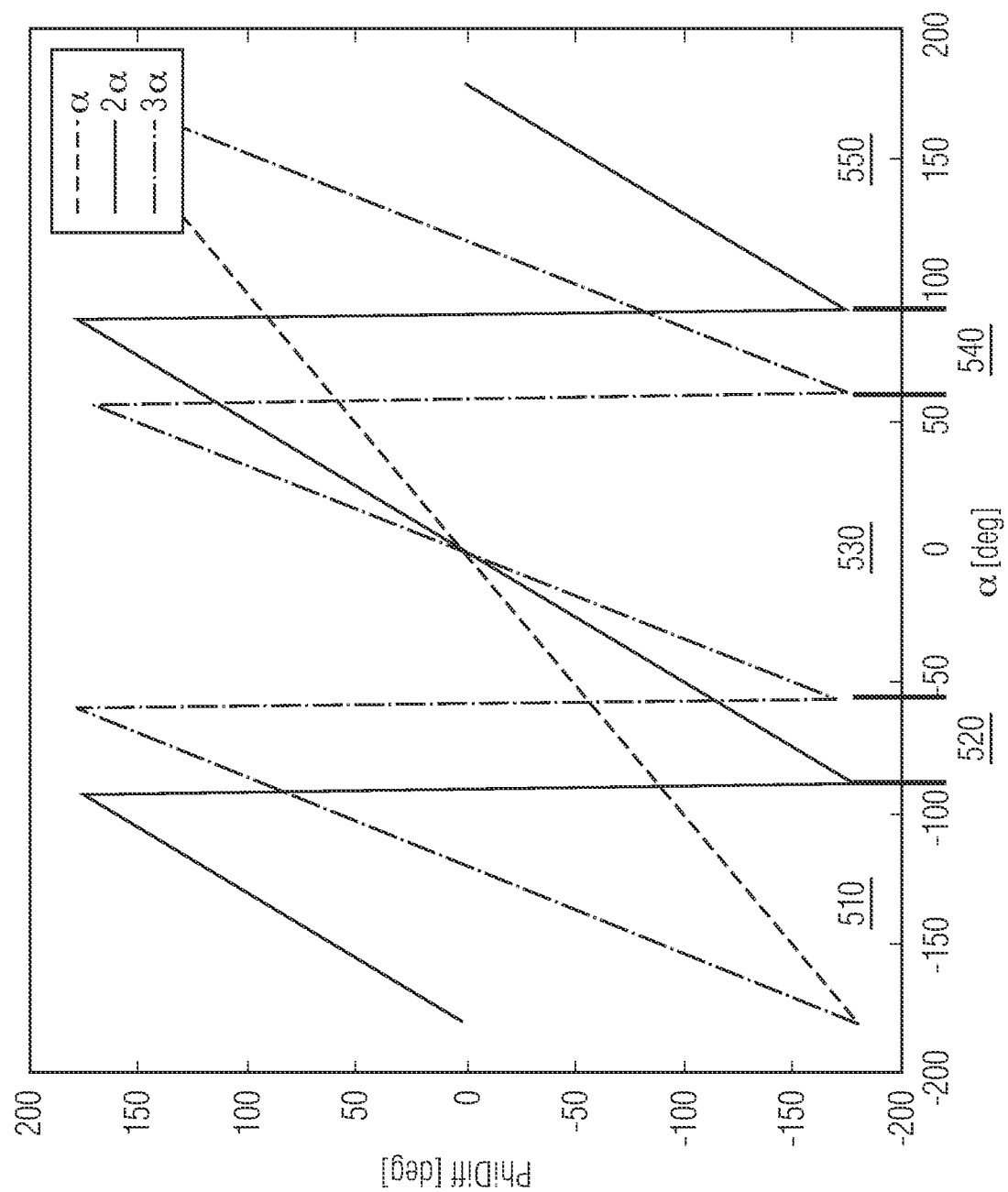
FIG. 5 is a chart illustrating an example of splitting the a domain into hypothesis regions, in accordance with embodiments of the present invention.

FIG. 5 is a chart illustrating an example of splitting the α domain into hypothesis regions according to the above method. Based on the chosen phase differences, the domain of α is split into five hypothesis regions: 510, 520, 530, 540, and 550. Each of these regions has a unique way of unwrapping the phases of the phasors related to 2α and 3α. In only one hypothesis region do the correctly unfolded phases lead to a maximal sum of the phasors. This is because the unfolded phases become phase-aligned in that hypothesis region. The hypothesis regions are defined as follows:

Hypothesis region 510: $-\pi<\alpha\leq-\pi/2$, the phase unwrapping for this region is as follows:
$\alpha_{1,est}=\theta_1$
$\alpha_{2,est}=(\theta_2-2\pi)/2$
$\alpha_{3,est}=(\theta_3-2\pi)/3$ Hypothesis region 520: $-\pi/2<\alpha\leq\pi/3$, the phase unwrapping for this region is as follows:
$\alpha_{1,est}=\theta_1$
$\alpha_{2,est}=\theta_2/2$
$\alpha_{3,est}=(\theta_3-2\pi)/3$ Hypothesis region 530: $-\pi/3<\alpha\leq\pi/3$, the phase unwrapping for this region is as follows:
$\alpha_{1,est}=\theta_1$
$\alpha_{2,est}=\theta_2/2$
$\alpha_{3,est}=\theta_3/3$ Hypothesis region 540: $\pi/3<\alpha\pi/2$, the phase unwrapping for this region is as follows:
$\alpha_{1,est}=\theta_1$
$\alpha_{2,est}=\theta_2/2$
$\alpha_{3,est}=(\theta_3-2\pi)/3$ Hypothesis region 550: $\pi/2<\alpha\leq\pi$, the phase unwrapping for this region is as follows:
$\alpha_{1,est}=\theta_1$
$\alpha_{2,est}=\theta_2/2$
$\alpha_{3,est}=(\theta_3-2\pi)/3$ Once the phases of the individual phasors are unwrapped (430), then they can be combined for each region to obtain the sum $H_k$ (440):

$$H_k=w_1A_1\exp(j\alpha_{1,est})+w_2A_2\exp(j\alpha_{2,est})+w_3A_3\exp(j\alpha_{3,est})$$

Once the sums $H_k$ for the five regions are determined, the sum $H_k$ that has maximum absolute value is selected (450). This maximum absolute value corresponds with a proper phase alignment of the individual phasors and therefore to proper unwrapping of the phases. The estimate for α is then $\alpha_{est}=\arg(H_{k_{max}})$ (460), and the estimate for the DoA angle becomes $$\varphi_{est} = \sin^{-1}\frac{\alpha_{est}}{\pi} (470).$$

In the above equation, the weights $w_m$ need to be determined. In one embodiment, this is performed by regarding the combining of the individual phasors as a Maximum Ratio Combining problem with correlated noise. The individual phasors with phase unwrapping can be written as $\tilde{Z}_m=A_m\exp(j\alpha_{m,est})=A\exp(j\alpha)+n_m$. The additive noise component $n_m$ is thus: $n_m=\tilde{Z}_m-A\exp(j\alpha)$, where A is the noise free amplitude and α corresponds to the true DoA angle φ according to the relation $\alpha=\pi\sin\varphi$, as discussed above.

For the m phasors $\tilde{Z}_m$, the corresponding noise components $n_m$ are collected in a vector $\underline{n}=(n_1,\ldots,n_M)^T$. A covariance matrix of this noise vector is defined by $C_n=E[\text{conj}(\underline{n})\,\underline{n}^T]$ and can be determined using analytical calculation or by Monte-Carlo simulations, for example. Using Maximum Ratio Combining criteria, the optimal weights vector is given by $\underline{w}=(C_n)^{-1}\,\underline{1}$, where 1 is the all-one vector. The calculated weight vector $\underline{w}=(w_1,\ldots,w_M)^T$ thus compensates both for differences in noise variance of the individual phasors and also for correlation of the noise. Phasors $\tilde{Z}_m$ can have antenna element signals $Y_i$ in common and therefore the noise in $\tilde{Z}_m$ can become correlated.

The actual value of $C_n$ is determined by 1) the antenna array configuration, 2) the set of phase differences are selected, and 3) the actual SNR on the channel. For a given antenna array and DoA estimation algorithm (a selection of which phase differences one likes to use), the weight can be determined by design (e.g., generated during design or manufacture and put in ROM or RAM memory) for a given SNR (for example, a minimum SNR for which the DoA estimator should work).

The presented method to determine the weights also provides a preview to an expected SNR of the combined phasor: $\text{SNR}=(\underline{1}^T\,w)\,A^2$. Hence, one can determine which set of phase differences provides the largest gain and phase differences can be left out that do not contribute to an improved result. This provides a good insight in a complexity versus performance trade-off. The performance of a specific selection of phase differences can be predicted, but with Monte Carlo simulations one can by design verify the performance of such a set. One design rule is that a preferable phase difference set has a greatest common divisor (GCD) equal to 1 in terms of $\alpha=\pi\sin\varphi$, where phase difference α when present in the phase difference set should not be used for determining the GCD. However, the invention is not limited to proper choices of phase difference sets only. For the example antenna array presented in FIG. 2, using the four phase differences related to the estimation of α, 2α, 3α and 13α can be shown to provide most of the performance while including more phase differences marginally improves the result.

In one alternative embodiment, different sets of weights can be used for selection of the hypothesis and for the DoA estimation. Performance of the DoA estimation is then determined by two components:

How well the proper hypothesis region can be selected. At low SNR, the probability of choosing the wrong hypothesis region increases. One can use a set of weights $\underline{w}_1$ for selecting the correct hypothesis region from $H_{1,k}$. The weighting set $\underline{w}_1$ should be optimized for finding the right hypothesis region. Alternatively, more hypothesis combinations can be calculated per region.

How accurately the DoA angle can be retrieved from the sum $H_k$. After finding the correct hypothesis region, the sum $H_{2,k}$ can be determined using a second set of weights $\underline{w}_2$.

In another alternative embodiment, where antenna elements suffer from amplitude and phase errors, the weights can compensate for residual errors that remain after calibration.

In a further alternative embodiment, rather than combining phasors which unwrap to a, the phasors can be combined to a multiple of a by multiplying individual phasors. For example, $(Z_1)^3$, $Z_1^*Z_2$ and $Z_3$ can form a consistent set of phasors for phase difference 3α. This alternative embodiment can provide more options to create phasors. These phasors can introduce additional correlation and therefore each will have a smaller weight.

As previously discussed, one hypothesis sum $H_k$ is calculated per hypothesis region. In an alternative embodiment, in one or more regions multiple hypotheses sums can be determined with phase unwrapping choices that are related to neighbouring regions. A primary source of error at low SNR is caused by erroneous unwrapping of the phases. An example of this effect is illustrated in curve 630 of FIG. 6, where the threshold SNR is 15 dB. This alternative embodiment decreases the impact of phase unwrap errors.

Figure 6:
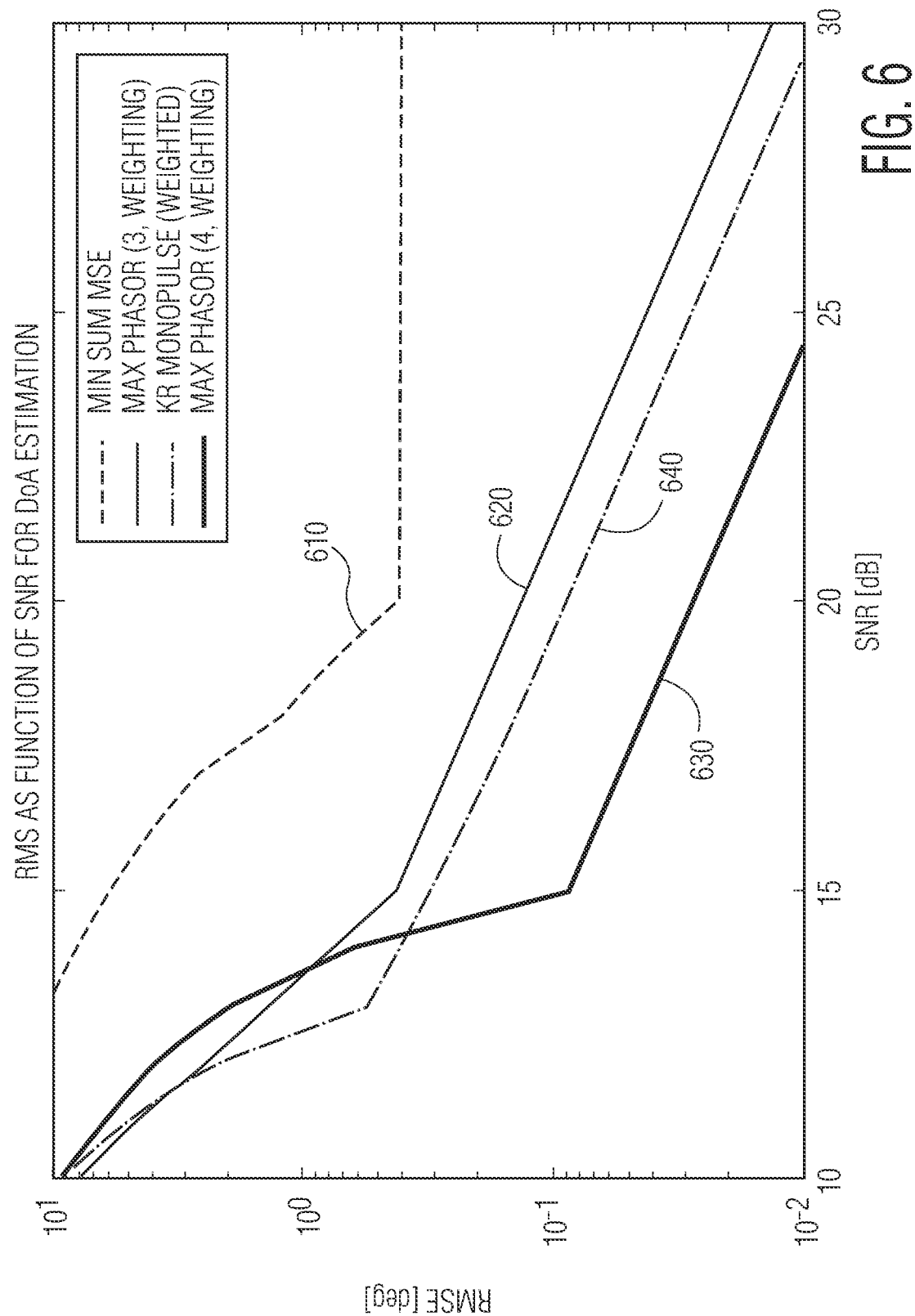
FIG. 6 is a chart illustrating examples of the performance of embodiments of the present invention compared to other methods.

FIG. 6 is a chart illustrating examples of the performance of embodiments of the present invention compared to other methods. Curve 610, labelled "min sum MSE", shows an example of the performance for an algorithm in which the mean-square-error is minimized between the phases of the phasors that belong to α, 2α and 3α on one hand and the expected phases for these phasors as function of the DoA angle. Curve 620 illustrates an example of the DoA performance of an embodiment of the present invention in a scenario in which three phase differences are used, namely α, 2α and 3α. Curve 630 illustrates an example of the DoA performance of an embodiment of the present invention in a scenario in which four phase differences are exploited: α, 2α, 3α and 13α. Finally, curve 640 illustrates an example of the performance of an alternative monopulse method based on a Khatri-Rao expansion, where the 2×4 MRA array is first expanded to a virtual ULA of 20 elements with λ/2 spacing and from that virtual array the phase differences are calculated from consecutive antenna element pairs, that is, they all form estimates of the phase difference α.

Embodiments of the present invention apply a pulse comparison monopulse technique to sparse antenna arrays in which more than one pair of antenna elements is used to estimate the DoA angle. But not all pairs of antenna elements need to be spaced less than λ/2. Further, embodiments optimally combine estimates of two or more pairs of antenna elements.

By now it should be appreciated that there has been provided a method for determining a direction of arrival (DOA) at a sparse antenna array of a radar pulse reflected by a target. The method includes determining two or more phasors corresponding to the radar pulse where each phasor is associated with pairs of antennas in the sparse antenna array, splitting a phase α domain into a plurality of hypothesis regions, for each hypothesis region: unwrapping phases of the two or more phasors to determine a phase associated with each phasor in each hypothesis region and combining the associated phases of each phasor, determining a hypothesis region having a highest absolute value of the combined phasors, determining a phase difference associated with the hypothesis region having the highest absolute value of the combined phasors using the combined phasor value, and determining the direction of arrival using the determine phase difference.

In one aspect of the above embodiment, splitting the phase α domain into a plurality of hypothesis regions includes selecting each domain such that each domain includes a unique formula to unwrap a phasor associated with a multiple of phase α. In a further aspect, a phase $α_1$ includes a single, unambiguous multiple of the phase difference.

In another aspect, combining the associated phases of each phasor includes $$H_k = \sum_{m=1}^{M} w_m(A_m \exp(j\alpha_{m,est}))$$

where j is a complex number, $w_m$ is a weighting factor for phasor m, $A_m$ is a noise free amplitude of phasor m, and $α_{m,est}$ is an estimated phase of phasor m. A further aspect includes compensating for differences in noise variance of individual phasors and correlation of noise using a weighting vector $\underline{w}=(w_1, \ldots, w_M)^T$. A still further aspect includes calculating $\underline{w}$ using a maximum ratio combining criteria associated with noise components of the phasors.

Another embodiment provides a radar system that includes a plurality of radar transmitters, a plurality of radar receivers, and a radar controller processor coupled to the plurality of radar transmitters and plurality of radar receivers. The plurality of radar transmitters and radar receivers form a sparse antenna array. The radar controller processor is configured to receive a radar pulse reflected by a target at the sparse antenna array, determine two or more phasors corresponding to the radar pulse where each phasor is associated with pairs of antennas in the sparse antenna array, split a phase α domain into a plurality of hypothesis regions, for each hypothesis region: unwrap phases of the two or more phasors to determine a phase associated with each phasor in each hypothesis region and combine the associated phases of each phasor, determine a hypothesis region having a highest absolute value of the combined phasors, determine a phase difference associated with the hypothesis region having the highest absolute value of the combined phasors using the combined phasor value, and determine the direction of arrival using the determine phase difference.

In one aspect, the radar controller processor is configured to split the phase α domain into a plurality of hypothesis regions by being further configured to select each domain such that each domain includes a unique formula to unwrap a phasor associated with a multiple of phase α. In a further aspect, a phase $α_1$ includes a single, unambiguous multiple of the phase difference.

In another aspect, combining the associated phases of each phasor includes performing the calculation $$H_k = \sum_{m=1}^{M} w_m (A_m \exp(j\alpha_{m,est}))$$

where j is the complex number, $w_m$ is a weighting factor for phasor m, $A_m$ is a noise free amplitude of phasor m, and $\alpha_{m,est}$ is an estimated phase of phasor m. In a further aspect, the radar controller processor is further configured to compensate for differences in noise variance of individual phasors and correlation of noise by using a weighting vector $\underline{w} = (w_1, \ldots, w_M)^T$. In yet a further aspect, the radar controller processor is further configured to calculate $\underline{w}$ using a maximum ratio combining criteria associated with noise components of the phasors.

Another embodiment provides a processor that is coupled to a sparse antenna array. The processor is configured to execute instructions to receive information associated with an RF signal arriving at the sparse antenna array, determine two or more phasors corresponding to the RF signal where each phasor is associated with pairs of antennas in the sparse antenna array, split a phase α domain into a plurality of hypothesis regions, for each hypothesis region: unwrap phases of the two or more phasors to determine a phase associated with each phasor in each hypothesis region and combine the associated phases of each phasor, determine a hypothesis region having a highest absolute value of the combined phasors, determine a phase difference associated with the hypothesis region having the highest absolute value of the combined phasors using the combined phasor value, and determine a direction of arrival of the RF signal using the determined phase difference.

In one aspect of the above embodiment, the instructions for splitting the phase α domain into a plurality of hypothesis regions include further instructions to select each domain such that each domain includes a unique formula to unwrap a phasor associated with a multiple of phase α. In a further aspect, a phase $\alpha_1$ comprises a single, unambiguous multiple of the phase difference.

In another aspect, the instructions for combining the associated phases of each phasor include further instructions to perform the calculation $$H_k = \sum_{m=1}^{M} w_m (A_m \exp(j\alpha_{m,est}))$$

where j is the complex number, $w_m$ is a weighting factor for phasor m, $A_m$ is a noise free amplitude of phasor m, and $\alpha_{m,est}$ is an estimated phase of phasor m. In a further aspect, the processor is configured to execute further instructions to compensate for differences in noise variance of individual phasors and correlation of noise by using a weighting vector $\underline{w} = (w_1, \ldots, w_M)^T$. In yet a further aspect, the processor is further configured to calculate $\underline{w}$ using a maximum ratio combining criteria associated with noise components of the phasors.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different radar systems. For example, although FIG. 1 and the discussion thereof describe an exemplary radar architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of radar system 100 are circuitry located on a single integrated circuit or within a same device. Alternatively, radar system 100 may include any number of separate integrated circuits or separate devices interconnected with each other.

Furthermore, those skilled in the art will recognize that boundaries between the functionality of the above-described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 100, for example, from computer readable media such as a memory associated with radar controller processor 20 or other media on other computer systems. Such computer readable media may be permanently, removably or remotely coupled to an information processing system such as system 100. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for determining a direction of arrival (DoA) at a sparse antenna array of a radar pulse reflected by a target, the method comprising:
   determining two or more phasors corresponding to the radar pulse wherein each phasor is associated with pairs of antennas in the sparse antenna array;
   splitting a phase $\alpha$ domain into a plurality of hypothesis regions;
   for each hypothesis region,
      unwrapping phases of the two or more phasors to determine a phase associated with each phasor in each hypothesis region, and
      combining the associated phases of each phasor;
   determining a hypothesis region having a highest absolute value of the combined phasors;
   determining a phase difference associated with the hypothesis region having the highest absolute value of the combined phasors using the combined phasor value; and
   determining the direction of arrival using the determined phase difference.

2. The method of claim 1 wherein said splitting the phase $\alpha$ domain into a plurality of hypothesis regions comprises selecting each domain such that each domain comprises a unique formula to unwrap a phasor associated with a multiple of phase $\alpha$.

3. The method of claim 2 wherein a phase at comprises a single, unambiguous multiple of the phase difference.

4. The method of claim 1 wherein said combining the associated phases of each phasor comprises:

$$H_k = \sum_{m=1}^{M} w_m(A_m \exp(j\alpha_{m,est}))$$

wherein j is the complex number, $w_m$ is a weighting factor for phasor m, $A_m$ is a noise free amplitude of phasor m, and $\alpha_{m,est}$ is an estimated phase of phasor m.

5. The method of claim 4 further comprising compensating for differences in noise variance of individual phasors and correlation of noise using a weighting vector $\underline{w} = (w_1, \ldots, w_M)^T$.

6. The method of claim 5 further comprising calculating $\underline{w}$ using a maximum ratio combining criteria associated with noise components of the phasors.

7. A radar system comprising:
   a plurality of radar transmitters;
   a plurality of radar receivers, wherein the plurality of radar transmitters and radar receivers form a sparse antenna array; and
   a radar controller processor, coupled to the plurality of radar transmitters and the plurality of radar receivers, and configured to
      receive a radar pulse reflected by a target at the sparse antenna array,
      determine two or more phasors corresponding to the radar pulse wherein each phasor is associated with pairs of antennas in the sparse antenna array,
      split a phase $\alpha$ domain into a plurality of hypothesis regions,
      for each hypothesis region, unwrap phases of the two or more phasors to determine a phase associated with each phasor in each hypothesis region and combine the associated phases of each phasor,
      determine a hypothesis region having a highest absolute value of the combined phasors,
      determine a phase difference associated with the hypothesis region having the highest absolute value of the combined phasors using the combined phasor value, and
      determine the direction of arrival using the determined phase difference.

8. The radar system of claim 7 wherein the radar controller processor is configured to split the phase $\alpha$ domain into a plurality of hypothesis regions by being further configured to select each domain such that each domain comprises a unique formula to unwrap a phasor associated with a multiple of phase α.

9. The radar system of claim 8 wherein a phase $\alpha_1$ comprises a single, unambiguous multiple of the phase difference.

10. The radar system of claim 7 wherein combining the associated phases of each phasor comprises performing the calculation:

$$H_k = \sum_{m=1}^{M} w_m(A_m \exp(j\alpha_{m,est}))$$

wherein j is the complex number, $w_m$ is a weighting factor for phasor m, $A_m$ is a noise free amplitude of phasor m, and $\alpha_{m,est}$ is an estimated phase of phasor m.

11. The radar system of claim 10 wherein the radar controller processor is further configured to compensate for differences in noise variance of individual phasors and correlation of noise by using a weighting vector $\underline{w}=(w_1, \ldots, w_M)^T$.

12. The radar system of claim 11 wherein the radar controller processor is further configured to calculate $\underline{w}$ using a maximum ratio combining criteria associated with noise components of the phasors.

13. A processor, coupled to a sparse antenna array, the processor configured to execute instructions to:
receive information associated with a radio frequency (RF) signal arriving at the sparse antenna array;
determine two or more phasors corresponding to the RF signal wherein each phasor is associated with pairs of antennas in the sparse antenna array;
split a phase α domain into a plurality of hypothesis regions;
for each hypothesis region, unwrap phases of the two or more phasors to determine a phase associated with each phasor in each hypothesis region and combine the associated phases of each phasor;
determine a hypothesis region having a highest absolute value of the combined phasors;
determine a phase difference associated with the hypothesis region having the highest absolute value of the combined phasors using the combined phasor value; and
determine a direction of arrival of the RF signal using the determined phase difference.

14. The processor of claim 13 wherein the instructions for splitting the phase α domain into a plurality of hypothesis regions comprise further instructions to select each domain such that each domain comprises a unique formula to unwrap a phasor associated with a multiple of phase α.

15. The processor of claim 14 wherein a phase $\alpha_1$ comprises a single, unambiguous multiple of the phase difference.

16. The processor of claim 13 wherein the instructions for combining the associated phases of each phasor comprise further instructions to perform the calculation:

$$H_k = \sum_{m=1}^{M} w_m(A_m \exp(j\alpha_{m,est}))$$

wherein j is the complex number, $w_m$ is a weighting factor for phasor m, $A_m$ is a noise free amplitude of phasor m, and $\alpha_{m,est}$ is an estimated phase of phasor m.

17. The processor of claim 16 wherein the processor is configured to execute further instructions to compensate for differences in noise variance of individual phasors and correlation of noise by using a weighting vector $\underline{w}=(w_1, \ldots, w_M)^T$.

18. The processor of claim 17 wherein the processor is further configured to calculate $\underline{w}$ using a maximum ratio combining criteria associated with noise components of the phasors.

* * * * *